United States Patent
Choi

(10) Patent No.: US 6,629,131 B1
(45) Date of Patent: Sep. 30, 2003

(54) REGISTRATION MAIL SYSTEM WITH A SENT E-MAIL CHECK FUNCTION ON INTERNET AND METHOD FOR THE SAME

(75) Inventor: Woo Jin Choi, Seoul (KR)

(73) Assignee: Nexen Co., Ltd., Seoul (KR)

( * ) Notice: Subject to any disclaimer, the term of this patent is extended or adjusted under 35 U.S.C. 154(b) by 0 days.

(21) Appl. No.: 09/390,666

(22) Filed: Sep. 7, 1999

(51) Int. Cl.[7] .............................................. G06F 15/16
(52) U.S. Cl. ....................... 709/206; 709/207; 709/311; 707/104.1; 379/93.01; 379/93.24
(58) Field of Search ................................. 709/206, 207, 709/311; 379/93.01, 93.24; 707/104.1

(56) References Cited

U.S. PATENT DOCUMENTS

| | | | | |
|---|---|---|---|---|
| 5,781,901 A | * | 7/1998 | Kuzma | 358/402 |
| 6,108,688 A | * | 8/2000 | Nielsen | 709/206 |
| 6,175,859 B1 | * | 1/2001 | Mohler | 709/206 |
| 6,185,551 B1 | * | 2/2001 | Birrell et al. | 707/102 |
| 6,202,086 B1 | * | 3/2001 | Maruyama et al. | 358/434 |
| 6,226,670 B1 | * | 5/2001 | Ueno et al. | 340/10.1 |
| 6,289,212 B1 | * | 9/2001 | Stein et al. | 455/412 |
| 6,308,206 B1 | * | 10/2001 | Singh | 709/223 |
| 6,314,454 B1 | * | 11/2001 | Wang et al. | 358/402 |
| 6,332,164 B1 | * | 12/2001 | Jain | 709/203 |
| 6,393,456 B1 | * | 5/2002 | Ambler et al. | 709/200 |

\* cited by examiner

*Primary Examiner*—Zarni Maung
*Assistant Examiner*—Jinsong Hu
(74) *Attorney, Agent, or Firm*—Schweitzer Cornman Gross & Bondell LLP

(57) ABSTRACT

An electronic mailing method on the Internet with a function of reception confirmation is described. The method is comprising the steps of (a) assigning a unique code to the e-mail of a sender and recording the unique code in a database; (b) attaching to the e-mail a CGI executive program that automatically sends the unique code to the web server of the sender when the receiver receives the e-mail; (c) sending the unique code to the web server of the sender by the automatic execution of the CGI executive program when the e-mail is received by the receiver; and (d) comparing the unique code sent in the step (c) and the unique code recorded in the step (a) and, if they are identical, sending reception confirmation information to the sender.

3 Claims, 5 Drawing Sheets

REGISTRATION MAIL SYSTEM WITH A SENT E-MAIL CHECK FUNCTION ON INTERNET AND METHOD FOR THE SAME

BACKGROUND OF THE INVENTION

1. Field of the Invention

The present invention relates to a mail system and method for solving the problem that a sender cannot check whether or not a receiver received (read) a mail in an internet environment (FIG. 2) that is a switching system among mail servers independently operated .

2. Description of Related Art

Existing PC communication services (e.g., Chollian, Hitel, Nownuri, and Unitel in Korea) each provides a sent e-mail check function in exchanging mail between its own service users. This is possible because the service is a single mail system. However, the mail exchange between users of different services cannot be achieved. Namely, messages can be exchanged by e-mail only between users registered in the same service (FIG. 1).

On the other hand, users can freely exchange their message by e-mail regardless of services in which they registered according to the mail exchange system in the internet environment. Therefore, the existing PC communication services tend to provide an internet mail service together and the communication tends to be used based upon internet mail IDs (e-mail addresses). However, the existing internet mail service cannot provide a function allowing a sender to check whether or not a receiver read the mail sent by the sender. This is because internet mails are exchanged between independent mail servers. In this system, the sender cannot check the mail that the sender has sent to the receiver's mail server (FIG. 2).

SUMMARY OF THE INVENTION

Accordingly, the present invention is directed to a registration mail system with a sent e-mail check function on internet and method for the same that substantially obviates one or more of the limitations and disadvantages of the related art.

An objective of the present invention is to provide a registration mail system with a sent e-mail check function, wherein a unique code is given to each mail sent by a sender and recorded in a database (DB), a common gate interface (CGI) executive program through which the unique code and confirmation information are sent to a source mail system if a receiver reads the mail is attached to the mail itself which is sent to the receiver's mail server, if the receiver reads the mail, the unique code and confirmation information that have been sent to the mail center by the CGI executive program are compared with database information and recorded in the database, and confirmation of reception by the receiver is notified to the sender.

Additional features and advantages of the invention will be set forth in the following description, and in part will be apparent from the description, or may be learned by practice of the invention. The objectives and other advantages of the invention will be realized and attained by the structure as illustrated in the written description and claims hereof, as well as the appended drawings.

To achieve these and other advantages, and in accordance with the purpose of the present invention as embodied and broadly described, the present invention employs a mail control system for assigning a unique code to a mail sent by a sender, recording the code in a database, and attaching a CGI executive program to the mail. The mail control system organically acts with a mail server and is in linkage with a database.

The present invention also employs another mail control system for comparing reception confirmation information from a receiver with database information, recording the confirmation information in the database, and sending an informing signal to the sender. This mail control system organically acts with a web server and is in linkage with the database.

When the receiver reads the mail in an off-line state, if a mail client application used by the receiver for reading the mail does not support a hypertext markup language (HTML), or if a text based emulator is used for reading the mail, the above system cannot be applied, so a registration mail system is developed as an extended type based upon the above system. In stead of using the program attached to the mail to process the reception confirmation information, the registration mail system stores the text of the mail therein and first sends only the information of a title of the mail, registration mail reception link, and registration mail guide note to the receiver. If the receiver requests the text of the mail, the registration mail system sends the text of the mail to the receiver and records the reception of the mail in the database.

It is to be understood that both the foregoing general description and the following detailed description are exemplary and explanatory and are intended to provide further explanation of the invention as claimed.

BRIEF DESCRIPTION OF THE ATTACHED DRAWINGS

The accompanying drawings, which are included to provide a further understanding of the invention and are incorporated in and constitute a part of this specification, illustrate embodiments of the invention and together with the description serve to explain the principles of the invention.

DETAILED DESCRIPTION OF PREFERRED EMBODIMENT

Reference will now be made in detail to the preferred embodiments of the present invention, examples of which are illustrated in the accompanying drawings.

With reference to the accompanying drawings, the present invention will be described in detail.

Figure 1:
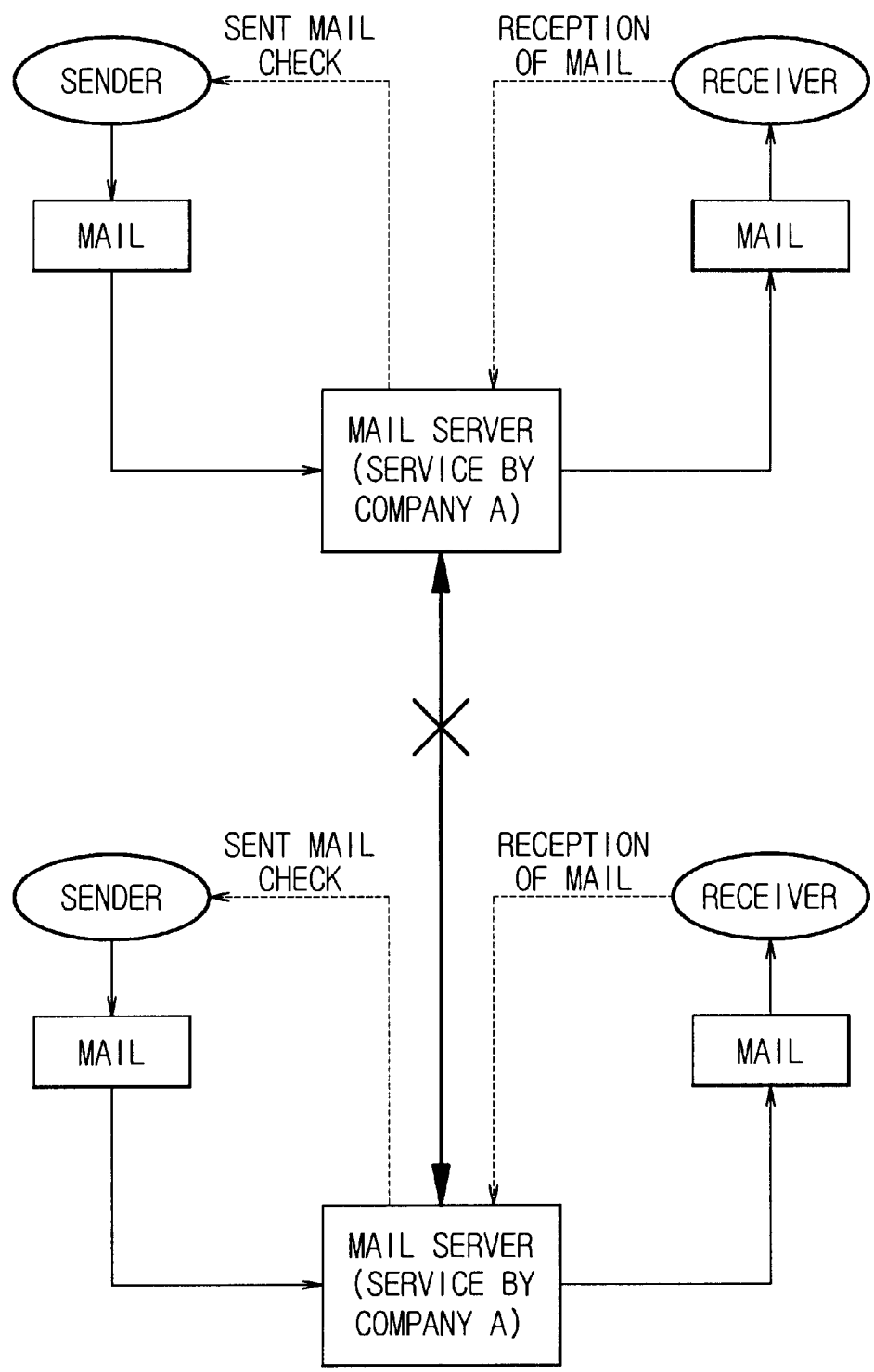
FIG. 1 is a block diagram showing a conventional mail system in PC communication.
Figure 2:
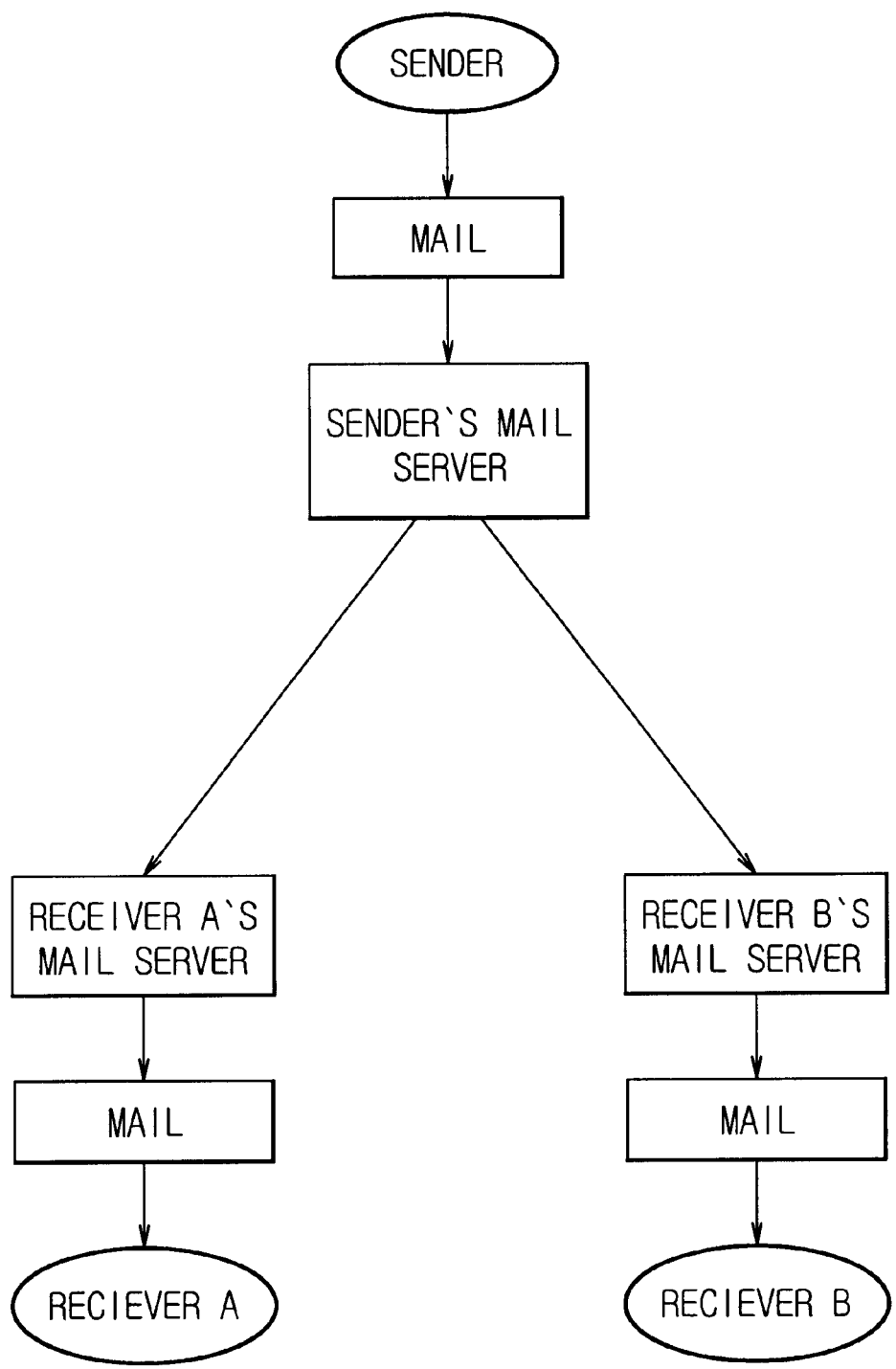
FIG. 2 is a block diagram showing a conventional e-mail system in an internet environment.
Figure 3:
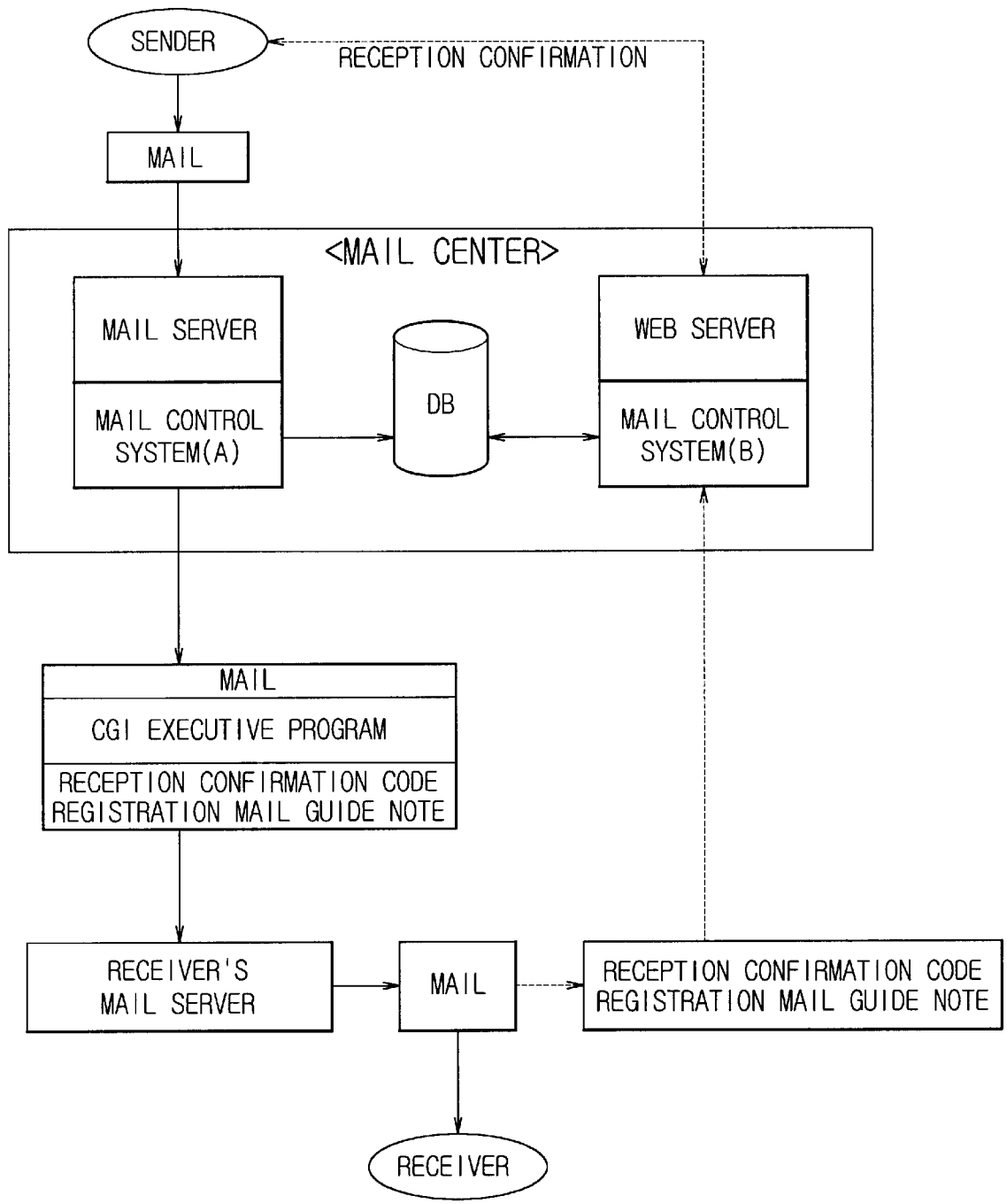
FIG. 3 is a block diagram showing an overall structure of a mail system with a sent e-mail check function according to the present invention.

FIG. 3 is a block diagram showing an overall structure of a mail system with a sent e-mail check function. Once a user composes a mail message and send it through this system, the mail is processed by a mail control system A which organically acts with a mail server. At this time, a unique code is assigned to the mail and the related information is recorded in a database. The mail control system A attaches the unique code and CGI executive program to the mail before sending it to the mail server of a receiver. If the receiver reads the arrived mail, the CGI executive program is carried out so as to send information confirming the read of the message by the receiver and the unique code of the mail to a mail control system B in a mail center. The received mail code is compared with the mail codes previously recorded in the database to find the same mail code. Reception confirmation information is added to the corresponding mail record in the database. Thereafter, the mail control system B sends a reception confirmation signal to the sender. Furthermore, the sender can check the sent mail after accessing the web server anytime when necessary (FIG. 3).

Figure 4:
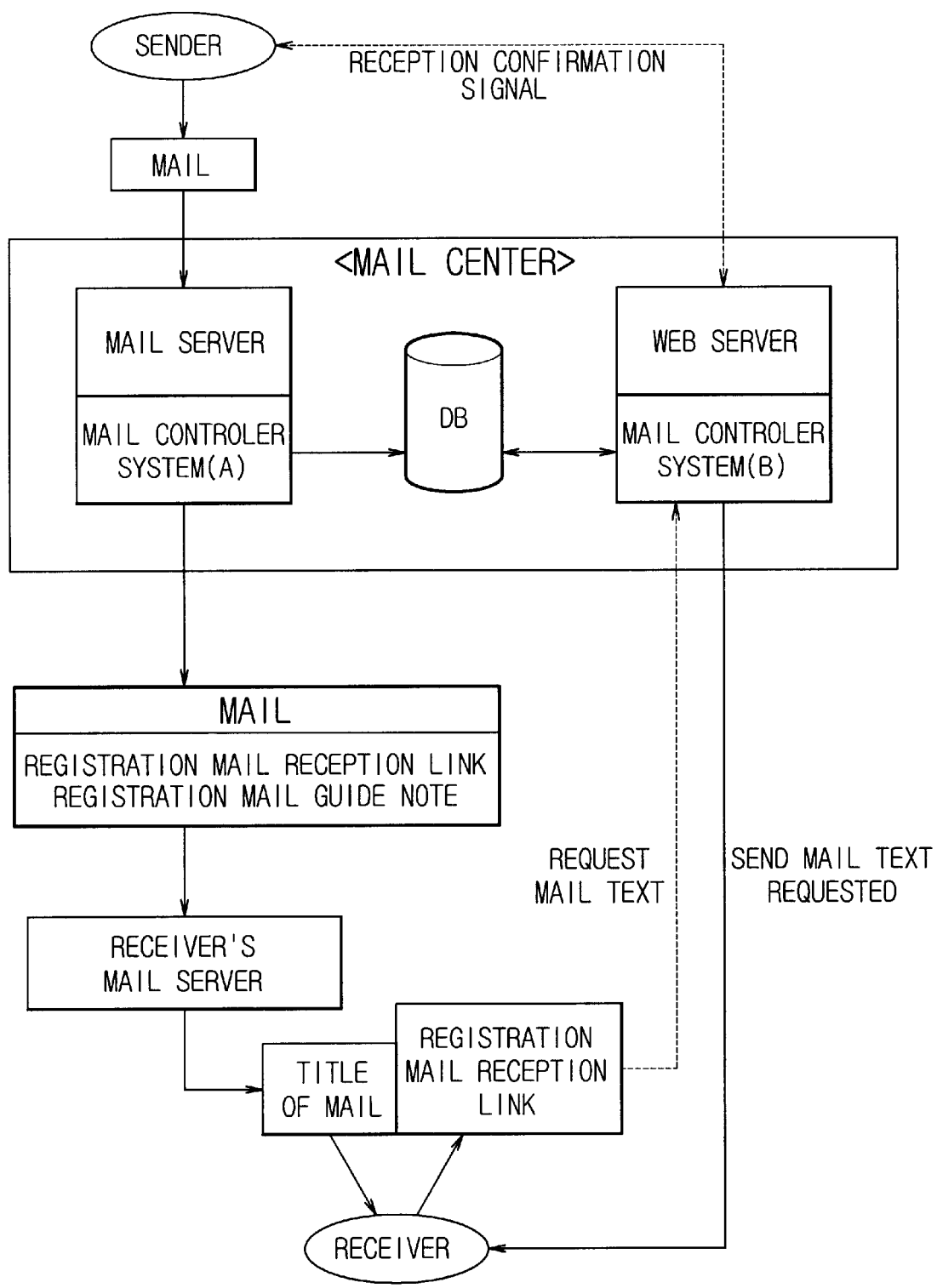
FIG. 4 is a block diagram showing an overall structure of an embodiment of a registration mail system with an extended sent e-mail check function according to the present invention.

A registration mail system extended from the above system is similar to the above system in that a unique code is assigned to a mail sent by a sender. However, differently from the above system, the text of the mail is separately stored and a registration mail reception link and a registration mail guide note (indicates registration mail receive method for a user checking e-mail with an emulator based upon text) are attached to the mail in the mail center before sending the mail to the receiver's mail server. Once the receiver receives (reads) the mail, the text of the mail stored is requested through the registration mail reception link attached to the mail. The mail text is then received by the receiver through direct connection. At this time, the mail control system B compares the unique code of the mail with the mail codes in the database and adds reception confirmation information to the record of the corresponding mail in the database. Subsequently, the mail control system B sends the reception confirmation signal to the sender. Furthermore, the sender can check the sent mail after accessing the web server anytime when necessary (FIG. 4).

Figure 5:
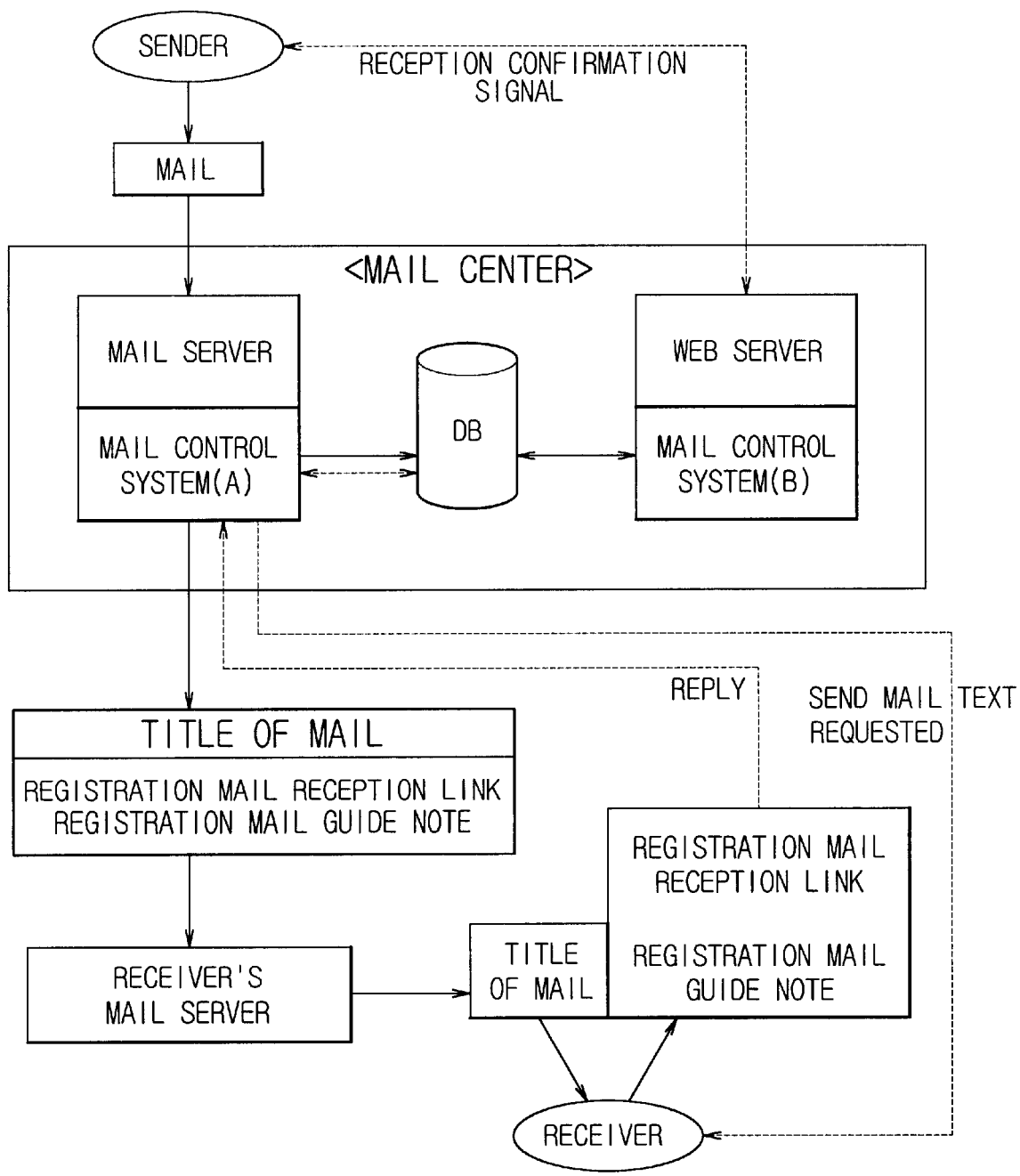
FIG. 5 is a block diagram showing an overall structure of another embodiment of a registration mail system with an extended sent e-mail check function according to the present invention.

However, if a mail client application used by the receiver for checking e-mail does not support HTML, or if the receiver checks the e-mail using the text based emulator, the above system cannot be applied. In this occasion, once the receiver just replies according to the content of the registration mail guide note, the mail control system A requests the text of the mail stored in the DB and sends it to the receiver. The mail control system A compares the unique code of the mail with the mail codes recorded in the DB and adds the reception confirmation information to the record of the corresponding mail. Thereafter, the mail control system B sends the reception confirmation signal to the sender. Furthermore, the sender can check the sent mail after accessing the web server anytime when necessary (FIG. 5).

Consequently, the present invention makes it possible to use a sent mail check function on internet, thereby overcoming the defect of the internet e-mail that has been the main method for mail exchange.

As illustrated, the present invention embodies an internet mail system supporting a sent mail check function. This is sufficiently important to the part of e-mail as means of communication. For example, when the e-mail is used for business, there may be some cases the success of the business depends on whether or not the receiver reads within a certain time limit. There may be some cases that reception itself is refused or that a sender cannot check whether or not the receiver reads the mail by phone or other means. The sent mail check function is very important to the sender in these cases as well as daily mail exchange. In case a receiver uses a plurality of e-mail addresses, the present invention makes it possible for a sender to find and send e-mail to the receiver's e-mail address that is not used frequently. As illustrated, the sent mail check function is very useful. As internet e-mail becomes more important and necessary as means of communication, effect of the sent mail check function achieved by the present invention increases.

It will be apparent to those skilled in the art that various modifications and variations can be made in the registration mail system with a sent e-mail check function on internet and method for the same of the present invention without deviating from the spirit or scope of the invention. Thus, it is intended that the present invention covers the modifications and variations of this invention provided they come within the scope of the appended claims and their equivalents.

What is claimed is:

1. An electronic mailing method on the Internet with a function of reception confirmation comprising:

(a) assigning a unique code to an e-mail of a sender and recording in a database the information on the unique code assigned to the e-mail;

(b) attaching to the e-mail, to which the unique code was assigned in the step of (a), a CGI (common gateway interface) executive program that automatically sends to the web server of the sender the unique code that was assigned in the step (a) when the receiver receives the e-mail;

(c) sending the unique code of the received e-mail to the web server of the sender by the automatic execution of the CGI executive program when the e-mail, to which the unique code was assigned in the step of (a) and to which the CGI executive program was attached in the step of (b), is received by the receiver; and (d) comparing the unique code of e-mail that was sent in the step (c) and the unique code that was recorded in the step (a) and, if they are identical, sending reception confirmation information to the sender.

2. An electronic mailing method on the Internet with a function of receipt confirmation, comprising the steps of:

(a) assigning a unique code to an e-mail sent by a sender and storing the unique code in a database;

(b) attaching a CGI executive program to the e-mail containing the unique code of step (a) in order to transmit the unique code which is assigned to the e-mail in step (a), to an e-mail system of the sender upon a receiver's receipt of the e-mail;

(c) transmitting the unique code of the e-mail received by the receiver to the e-mail mail system of the sender by an automatic execution of the CGI executive program upon the receiver's receipt of the e-mail which contains the unique code and the CGI executive program of step (b); and (d) delivering receipt confirmation information to the sender of the e-mail if the unique code of the e-mail transmitted in step (c) is identical to the information stored in the database.

3. An electronic mailing system on the Internet with a function of receipt confirmation, comprising:

a first mail control system having a mail processor part which assigns a unique code to e-mail sent by a sender, attaches a CGI executive program for e-mail transmitting the assigned unique code to the electronic mailing system upon a receiver's receipt of the e-mail, and transmits the e-mail to the receiver's mail server;

a database in which the unique code assigned by the mail processor part is recorded; and a second mail control system having a receipt confirmation part which receives the unique code of the e-mail transmitted by automatic execution of the CGI executive program, compares the transmitted unique code with the unique code recorded in the database, and transmits receipt confirmation information to the sender if the two unique codes are identical.

* * * * *